(12) United States Patent
Sakai et al.

(10) Patent No.: US 10,338,414 B2
(45) Date of Patent: Jul. 2, 2019

(54) OPTICAL MODULATOR MODULE

(71) Applicant: SUMITOMO OSAKA CEMENT CO., LTD., Tokyo (JP)

(72) Inventors: Takeshi Sakai, Tokyo (JP); Junichiro Ichikawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/719,582

(22) Filed: Sep. 29, 2017

(65) Prior Publication Data

US 2018/0095301 A1 Apr. 5, 2018

(30) Foreign Application Priority Data

Sep. 30, 2016 (JP) ................. 2016-194750

(51) Int. Cl.
*G02F 1/035* (2006.01)
*G02F 1/01* (2006.01)
*G02F 1/225* (2006.01)

(52) U.S. Cl.
CPC ............ *G02F 1/0102* (2013.01); *G02F 1/011* (2013.01); *G02F 1/0123* (2013.01); *G02F 1/035* (2013.01); *G02F 1/225* (2013.01)

(58) Field of Classification Search
None
See application file for complete search history.

(56) References Cited

U.S. PATENT DOCUMENTS

| | | | |
|---|---|---|---|
| 6,669,537 B2 | 12/2003 | Maeda et al. | |
| 2003/0104765 A1 | 6/2003 | Maeda et al. | |
| 2005/0244572 A1* | 11/2005 | Bristol | C23C 14/083 427/162 |
| 2008/0193074 A1* | 8/2008 | Sugiyama | G02F 1/2255 385/8 |
| 2015/0063743 A1* | 3/2015 | Katou | G02F 1/0121 385/3 |
| 2016/0161771 A1* | 6/2016 | Sugiyama | G02B 6/4201 385/3 |
| 2016/0291351 A1* | 10/2016 | Kataoka | G02F 1/2255 |
| 2016/0313503 A1* | 10/2016 | Takemura | G02F 1/0316 |

FOREIGN PATENT DOCUMENTS

| | | |
|---|---|---|
| JP | S62173428 | 7/1987 |
| JP | 2003172839 | 6/2003 |
| WO | WO 2017/171096 A1 * | 10/2017 |

* cited by examiner

*Primary Examiner* — Michael Stahl
(74) *Attorney, Agent, or Firm* — JCIPRNET

(57) ABSTRACT

Provided is an optical modulator module including a waveguide substrate in which an optical waveguide and control electrodes (signal electrode, DC bias electrodes, and the like) for controlling a light wave propagating through the optical waveguide are formed, a relay substrate which is disposed in the vicinity of the waveguide substrate and in which a DC bias wiring for supplying a DC bias voltage to the control electrodes (DC bias electrodes) is formed, and a package case which stores the waveguide substrate and the relay substrate. A loop of wire standing from the relay substrate to a position higher than a top surface of the waveguide substrate is provided in a part of the DC bias wiring. The loop of wire is disposed inside the package case at a position within 10 mm from any one of locations where a solder is used.

8 Claims, 2 Drawing Sheets

OPTICAL MODULATOR MODULE

CROSS-REFERENCE TO RELATED APPLICATIONS

This application claims the benefit of Japanese Patent Application No. 2016-194750 filed Sep. 30, 2016, the disclosure of which is herein incorporated by reference in its entirety.

BACKGROUND OF THE INVENTION

Field of the Invention

The present invention relates to an optical modulator module, and particularly relates to an optical modulator module including a waveguide substrate, a relay substrate which is disposed in the vicinity of the waveguide substrate, and a package case which stores the waveguide substrate and the relay substrate.

Description of Related Art

In the industry employing electronic wirings, it is known that a tin whisker grows slowly as time elapses, shortly comes into contact with a terminal on a printed wiring substrate, and causes a short-circuit fault.

Up to early 2000s, an occurrence of a tin whisker had been suppressed by adding lead to tin. Recently, due to environmental responses of electronic devices, such as Restriction on Hazardous Substances (RoHS), lead-free raw materials including lead-free solders come into use, and a short circuit caused by a whisker is regarded as a problem again.

In a LN optical modulator in which lithium niobate ($LiNbO_3$) is employed in a waveguide substrate, there is another problem caused by tin contained in a gold tin solder.

From a solder in a connection portion between a connector and a package case, a sealing connection portion between an optical fiber and the package case, and the like, tin is transported in the vapor phase to a place between electrodes in the LN optical modulator, is deposited and grows between the electrodes, and causes deterioration of bias stability.

In addition to the lead-free tendency, the deterioration of bias stability is also caused due to increased electric wiring portions such as a dual polarization-binary phase shift keying (DP-BPSK) modulator and a dual polarization-quadrature phase shift keying (DP-QPSK) modulator, a narrowed free space inside the package case, high integration density inside the modulator, and the like.

Moreover, in DP-QPSK for dual wavelength, in addition to the number of electric wirings, the number of connections with respect to optical fibers is also doubled, and particularly this problem has become noticeable.

In addition, in polarization multiplex-type optical modulator modules such as DP-BPSK modulators and DP-QPSK modulators, when an optical waveguide output port of each modulator and an optical fiber are connected to each other, lens coupling is generally carried out instead of butt joining.

In addition, in optical components used for polarization multiplex or modules having a lens coupling structure, in order to prevent an error burst caused when an optical axis is blocked by particles, the modules are assembled in clean environments.

In addition, in order to prevent aged deterioration of optical transmission properties (increase of an optical loss) caused by substances such as mist and sol which are transported in the vapor phase and adhere or are scorched on an end surface of an optical waveguide, each component is thoroughly cleaned, and a structure of a package case having dry nitrogen sealed therein is employed.

In this specification, a substance in a gaseous state or a substance which floats in a space and is transported, such as a particle, mist, and sol, will be generically referred to as a "vapor phase transportation substance".

In addition, recently, the following tendencies (1) to (3) are in progress.

(1) The significantly narrowed internal space of a package case resulted from the compact package case (2) The increased materials and members which may become a source of vapor phase transportation substances due to an increase in the number of components resulted from a highly integrated configuration (3) The increased quantity of light for lengthening a transmission distance and improving the optical signal-to-noise ratio (OSNR)

Therefore, a chance for a particle to meet an optical axis increases dramatically, and an error burst caused when the optical axis is blocked has become a serious problem.

In addition, due to the dramatically increased vapor phase transportation substances, aged deterioration of optical transmission properties (increase of an optical loss) caused by adhering or scorching of the substances has also become noticeable.

Moreover, due to the increased quantity of light, even though a vapor phase transportation substance does not approach an end of the optical waveguide, the substance is caught in a laser trap by only passing through the optical axis, so that the substance is fixed to a place on the optical axis or causes adhering or scorching on an end surface of a waveguide noticeably.

In addition, a LN crystal itself has a strong pyroelectric effect so that the crystal surface is strongly electrified due to a temperature change.

That is, an electrified vapor phase transportation substance has properties of being likely to be attracted to a LN crystal surface.

In order to ensure the operational stability, a conductive film such as an anti-electrification film and a metal film is generally formed in a substrate of a LN optical modulator, except for a surface (waveguide end port ion surface) having an end portion of an optical waveguide (for example, refer to Japanese Laid-open Patent Publication No. 62-173428 and Japanese Laid-open Patent Publication No. 2003-172839).

Meanwhile, an antireflection film is sometimes formed on the waveguide end portion surface. However, in most cases, the end portion surface remains bare and no conductive film is formed.

Therefore, electrified particles and the like are likely to be attracted to the waveguide end portion surface.

Particularly, in a case of being used in an environment in which the temperature environment changes drastically (for example, a radio-over-fiber (RoF) system and a car network (NW)), a LN crystal is electrified, thereby resulting in a serious problem.

SUMMARY OF THE INVENTION

An object of the present invention is to reduce problems of tin which is generated from a solder (solder in a connection portion between a connector and a package case, a sealing connection portion between an optical fiber and the package case, and the like) inside the package case of an optical modulator module, is transported in the vapor phase to a place between electrodes, is deposited and grows between the electrodes, and causes deterioration of bias stability.

According to the present invention, an optical modulator module has technical features as follows.

(1) There is provided an optical modulator module including a waveguide substrate in which an optical waveguide and a control electrode for controlling a light wave propagating through the optical waveguide are formed, a relay substrate which is disposed in the vicinity of the waveguide substrate and in which a DC bias wiring for supplying a DC bias voltage to the control electrode is formed, and a package case which stores the waveguide substrate and the relay substrate. A loop of wire standing from the relay substrate to a position higher than a top surface of the waveguide substrate is provided in a part of the DC bias wiring. The loop of wire is disposed inside the package case at a position within 10 mm from any one of locations where a solder is used.

(2) In the optical modulator module according to (1), the loop of wire also serves as a loop of wiring through which the DC bias wiring and a wiring of the control electrode on the waveguide substrate are electrically connected to each other.

(3) In the optical modulator module according to (1) or (2), the loop of wire is provided in both a positive wire and a negative wire of the DC bias wiring.

(4) In the optical modulator module according to any one of (1) to (3), a surface area of the loop of wire is 9,400 pmt or wider.

(5) In the optical modulator module according to any one of (1) to (4), the loop of wire is not coated.

(6) In the optical modulator module according to any one of (1) to (5), the DC bias voltage is 20 V or higher.

(7) In the optical modulator module according to any one of (1) to (6), a getter material adsorbing a vapor phase transportation substance is solder-connected to at least one of the waveguide substrate and the relay substrate.

(8) In the optical modulator module according to any one of (1) to (6), the DC bias wiring has a branched line.

According to the present invention, the optical modulator module includes the waveguide substrate in which the optical waveguide and the control electrode for controlling a light wave propagating through the optical waveguide are formed, the relay substrate which is disposed in the vicinity of the waveguide substrate and in which a DC bias wiring for supplying a DC bias voltage to the control electrode is formed, and the package case which stores the waveguide substrate and the relay substrate. The loop of wire standing from the relay substrate to a position higher than the top surface of the waveguide substrate is provided in a part of the DC bias wiring. The loop of wire is disposed inside the package case at a position within 10 mm from any one of the locations where a solder is used. Therefore, it is possible to reduce the problems of tin which is generated from the solder inside the package case of the optical modulator module, is transported in the vapor phase to a place between electrodes, is deposited and grows between the electrodes, and causes deterioration of bias stability.

DETAILED DESCRIPTION OF THE INVENTION

Hereinafter, an optical modulator module according to the present invention will be described in detail.

Figure 1:
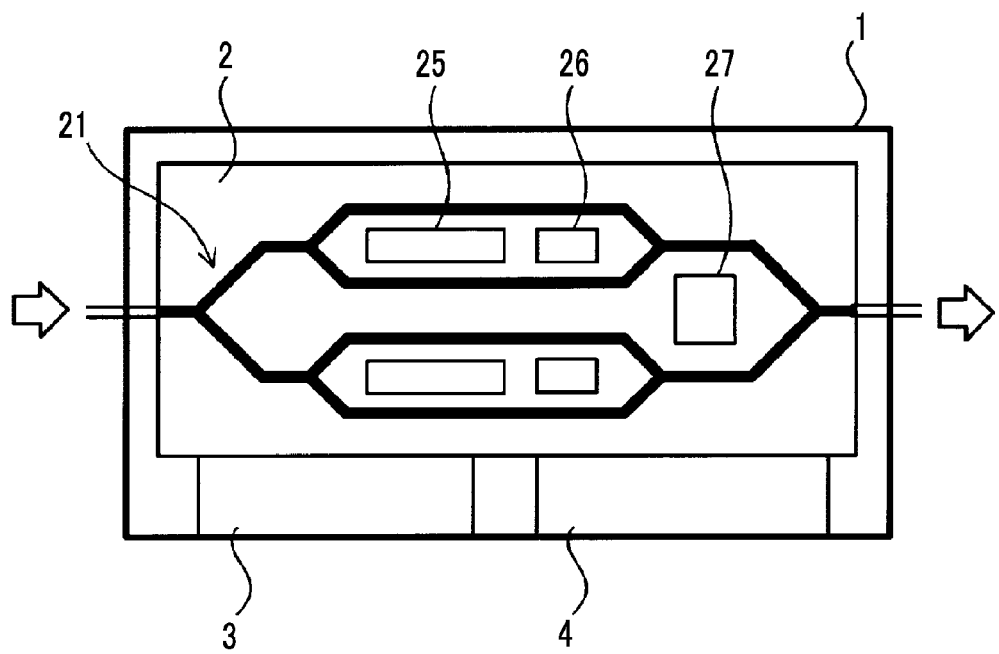
FIG. 1 is a plan view illustrating an example of an optical modulator module according to the present invention.
Figure 2:
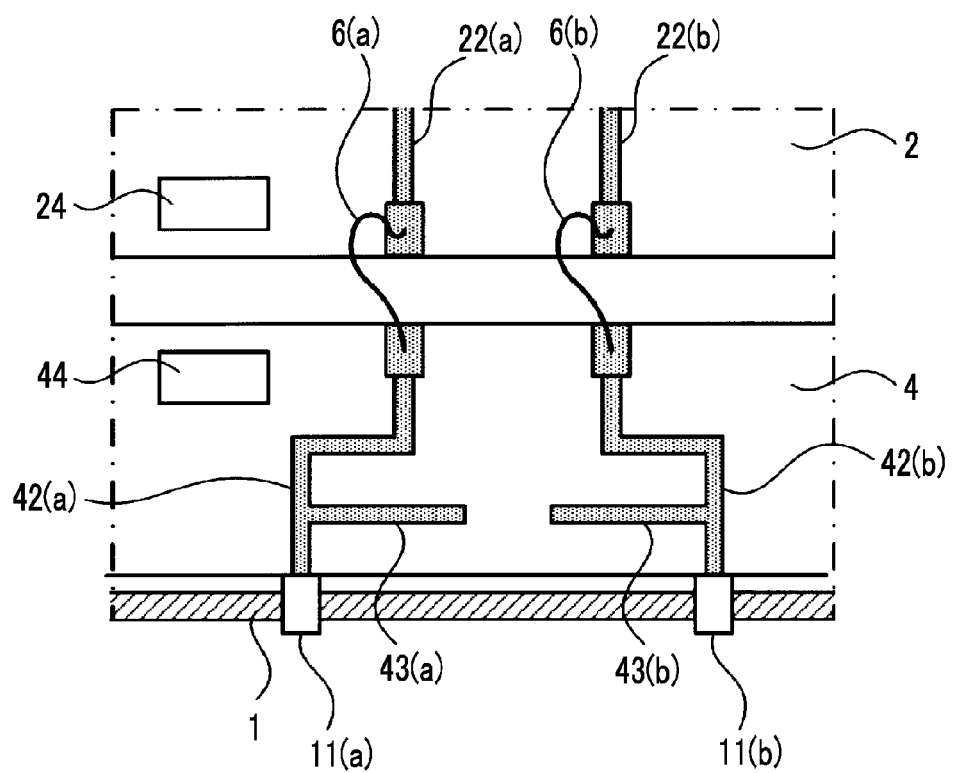
FIG. 2 is an enlarged view of a connection part between a waveguide substrate and a relay substrate.

As illustrated in FIG. 1 and FIG. 2, according to the present invention, there is provided an optical modulator module including a waveguide substrate 2 in which an optical waveguide 21 and control electrodes (signal electrode 25, DC bias electrodes 26 and 27, and the like) for controlling a light wave propagating through the optical waveguide 21 are formed, a relay substrate 4 which is disposed in the vicinity of the waveguide substrate 2 and in which a DC bias wiring 42 for supplying a DC bias voltage to the control electrodes (DC bias electrodes 26 and 27) is formed, and a package case 1 which stores the waveguide substrate 2 and the relay substrate 4. In the optical modulator module, a loop of wire 6 standing from the relay substrate 4 to a position higher than a top surface of the waveguide substrate 2 is provided in a part of the DC bias wiring 42. The loop of wire 6 is disposed inside the package case 1 at a position within 10 mm from any one of locations where a solder is used.

FIG. 1 is a plan view illustrating an example of an optical modulator module according to the present invention.

The optical modulator module has a structure in which the substrate 2 having the optical waveguide and the control electrodes formed therein, and the relay substrates 3 and 4 disposed in the vicinity of the substrate are stored inside the package case 1.

As the waveguide substrate 2, any substrate may be employed as long as an optical waveguide can be formed therein, such as quartz and a semiconductor. Particularly, it is possible to preferably utilize any single crystal of lithium niobate ($LiNbO_3$), lithium tantalate ($LiTaO_3$), and lead lanthanum zirconate titanate (PLZT), which is a substrate having an electro-optic effect.

For example, the optical waveguide 21 to be formed in the waveguide substrate 2 is formed by thermally diffusing a high refractive index substance such as titanium (Ti) on a $LiNbO_3$ substrate (LN substrate).

In addition, it is also possible to utilize a rib optical waveguide in which grooves are formed on both sides of a part which will serve as an optical waveguide, or a ridge waveguide having a convex optical waveguide part.

In addition, the present invention can also be applied to an optical circuit in which an optical waveguide is formed in waveguide substrates different from each other, such as PLC, and the waveguide substrates are affixed and integrated together.

The waveguide substrate 2 is provided with control electrodes for controlling a light wave propagating through the optical waveguide 21.

The control electrodes include the signal electrode 25 configuring a modulation electrode, a ground electrode (not illustrated) surrounding the modulation electrode, the DC bias electrodes 26 and 27 applying DC bias, and the like.

The control electrodes can be formed by forming an electrode pattern of Ti and Au on the substrate surface and performing a gold plating method or the like.

Moreover, as necessary, a buffer layer such as a dielectric substance $SiO_2$ can be provided on the substrate surface after the optical waveguide is formed.

The relay substrate 3 is a high-frequency signal relay substrate for relaying a modulation signal (high-frequency signal) to be applied to the signal electrode 25.

The relay substrate 4 is a low-frequency signal relay substrate for relaying a DC bias voltage (low-frequency signal) to be applied to the DC bias electrodes 26 and 27.

FIG. 2 is an enlarged view of a connection part between the waveguide substrate 2 and the relay substrate 4.

DC bias wirings 22(a) and 22(b) for respectively supplying DC bias voltages to the DC bias electrode 26 and 27 are formed in the waveguide substrate 2.

The DC bias wiring 22(a) is a positive wiring and is connected to a DC bias wiring 42(a) formed in the relay substrate 4, through a wire 6(a).

The DC bias wiring 22(b) is a negative wiring and is connected to a DC bias wiring 42(b) formed in the relay substrate 4, through a wire 6(b).

The package case 1 is provided with connectors (connection terminals) 11(a) and 11(b) for receiving the DC bias voltages from an external electric circuit. The DC bias wirings 42(a) and 42(b) are electrically connected to the external electric circuit via the connectors 11(a) and 11(b).

In the description below, unless the positive and negative sides of the DC bias are to be discriminated from each other, the reference signs (a) and (b) will be omitted.

The DC bias wiring 42 and the connector 11 are connected to each other using a solder, and there is a possibility that tin will be generated from the solder, will be transported in the vapor phase to a place between electrodes, will be deposited and grow between the electrodes, and will cause deterioration of bias stability.

Therefore, in the vicinity of a connector connection portion (connection part between the DC bias wiring 42 and the connector 11) which is a location where a solder is used, a loop of wire standing from the relay substrate 4 to a position higher than the top surface of the waveguide substrate 2 is provided in a part of the DC bias wiring 42.

Figure 3:
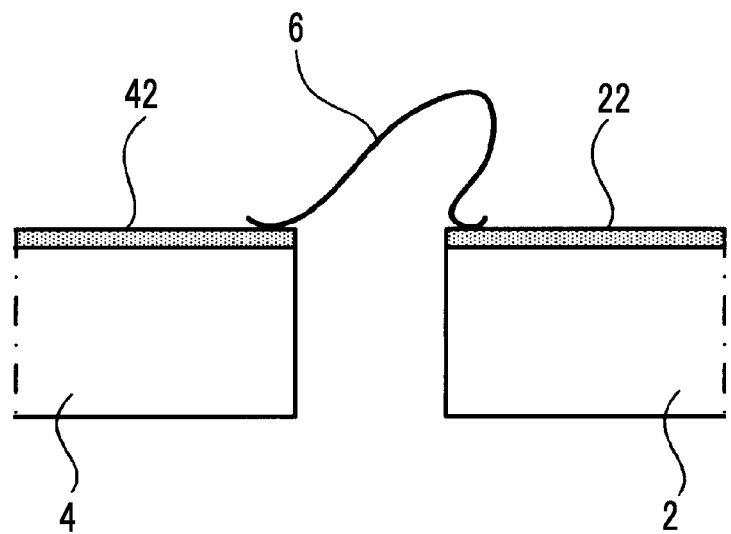
FIG. 3 is a view illustrating an example of a loop of wire provided in a part of a DC bias wiring.

The example in FIG. 3 illustrates a structure of a loop of wiring in which the DC bias wiring 22 and the DC bias wiring 42 are electrically connected to each other through the wire 6, and the wire 6 also serves as the loop of wire.

In a case where a loop of wiring other than a wire (for example, a ribbon) is employed in order to cause the DC bias wiring 22 and the DC bias wiring 42 to be electrically connected to each other, it is needless to mention that the loop of wiring can also serve as the loop of wire.

Here, as illustrated in FIG. 3, the loop of wire (wire 6) is formed to stand from the relay substrate 4 to a position higher than the top surface of the waveguide substrate 2.

That is, the loop of wire is in a shape of bulging upward from an electrode forming surface of the waveguide substrate 2.

Accordingly, since tin generated from a solder used for the connector connection portion is captured by the loop of wire in the middle of the way to the electrode on the waveguide substrate 2, the tin is restrained from being deposited and growing between the electrodes of the waveguide substrate 2.

In order to efficiently capture tin generated from a solder, it is preferable that the loop of wire is disposed at a position within 10 mm from the location where a solder is used.

In addition, it is preferable that the loop of wire is not coated. Particularly, it is preferable that the loop of wire is formed of bare gold (Au) which can easily capture tin (Sn).

In this example, both the wire 6(a) on the positive side and the wire 6(b) on the negative side of the DC bias are formed as the loops of wire in shapes of bulging upward from the electrode forming surface of the waveguide substrate 2.

Accordingly, tin generated from the positive connector connection portion (connector 11(a) side) and tin generated from the negative connector connection portion (connector 11(b) side) can be efficiently captured.

In addition, this example is focused on capturing tin (Sn). However, it is also possible to acquire an effect in other contained materials included inside the optical modulator module.

For example, there are cases where components are excessively deposited, such as zinc (Zn), aluminum (Al), magnesium (Mg), chromium (Cr), titanium (Ti), nickel (Ni), cobalt (Co), and quartz ($SiO_2$) contained in optical components which are used in an optical waveguide substrate or a polarization multiplex portion.

Moreover, there are cases of including a conductive adhesive (silver paste) which is often used for connecting the relay substrate and the package case to each other, or a flux (halogenated compound: fluorine (F), iodine (I), chlorine (Cl), and bromine (Br)) from a solder for connecting an external optical fiber and the package case together.

In these substances, each element has the electro-negativity properties and is generally ranked high in the group numbers in the periodic table of elements. An element having a smaller group number has a stronger force to attract electrons.

As an example, in the substances mentioned above, chromium (Cr), titanium (Ti), magnesium (Mg), and the like have properties of being attracted to the positive side of the DC bias, and tin (Sn), zinc (Zn), silver (Ag), fluorine (F), and the like have properties of being attracted to the negative side of the DC bias.

Thus, in the present example, is ascertained that the configuration is also effective in capturing other particle substances, in addition to tin (Sn).

From the results of an experiment and a research, it has been found that the surface area (in total) of the loop of wire is preferably set to 9,400 $\mu m^2$ or wider.

In addition, it has been found that the DC bias voltage to be applied to the loop of wire is preferably set to 20 V or higher.

For example, as in FIG. 2, in a case of employing two loops of wire having a circular cross-sectional shape, it is preferable that each of the loops of wire has a diameter of 30 $\mu m$ or greater and a length of 50 $\mu m$ or longer. In addition, it is preferable that a voltage of +20 V or higher is applied to the wire 6(a) and a voltage of −20 V or lower is applied to the wire 6(b).

In the case of this example, the surface area of the loop of wire is figured out to be 9, 420 $\mu m^2$ by the following expression.

Surface area of loop of wire=diameter of loop of wire×π×length of loop of wire×the number of loops of wire =30 $\mu m$×3.14×50 $\mu m$×2

=9420 $\mu m^2$

In addition, in regard to mounting conditions inside a modulator, when the loop of wire has a length of 200 $\mu m$ or longer, reliability can be further enhanced. In this case, it is desirable that the surface area of the loop of wire (in total) is set to 44,000 $\mu m^2$ or wider.

As a specific example, in consideration of the coefficients of linear expansion of the waveguide substrate, the relay substrate, and the package case of the modulator, in a case where the interval between the substrates is 200 μm, it is preferable that the length of the loop of wire is set to 236 μm. In this case, the surface area of the loop of wire is figured out to be 44,462.4 μm² by the following expression.

Surface area of loop of wire=30 μm×3.14×236 μm×2=44,462.4 μm²

The loop of wire is not limited to the configuration of serving as the loop of wiring connecting the DC bias wiring 22 and the DC bias wiring 42 together.

Figure 4:
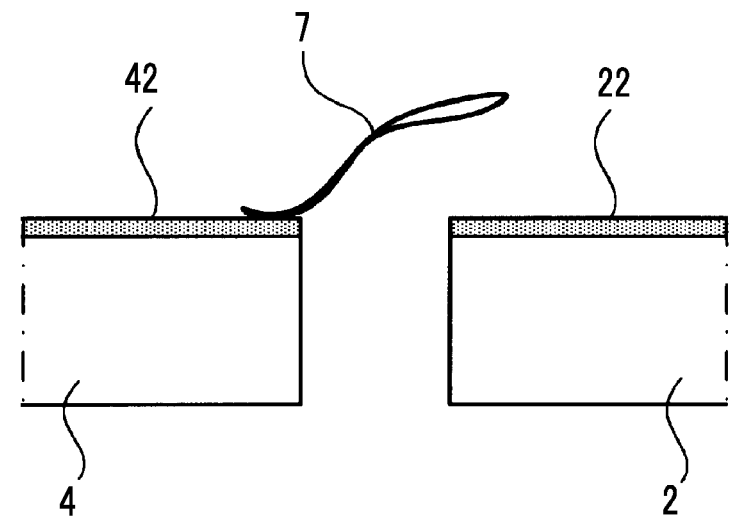
FIG. 4 is a view illustrating another example of the loop of wire provided in a part of the DC bias wiring.

That is, as in another example illustrated in FIG. 4, a wire 7 which bulges upward from a part of the DC bias wiring 42 on the electrode forming surface of the waveguide substrate 2 and is not connected to the DC bias wiring 22 may be employed.

In addition, in the example of FIG. 2, a getter material 24 adsorbing vapor phase transportation substances is solder-connected to the waveguide substrate 2. Similarly, a getter material 44 is also solder-connected to the relay substrate 4.

The loop of wire (wire 6(*a*)) is provided at a position in the vicinity of (within 10 mm) the getter materials 24 and 44, thereby enhancing the effect of capturing tin.

The getter material may be provided in only one of the waveguide substrate and the relay substrate.

In addition, in the example of FIG. 2, branched lines 43(*a*) and 43(*b*) are respectively provided in the DC bias wirings 42(*a*) and 42(*b*) on the relay substrate 4.

When such a branched line 43 is provided in the DC bias wiring 42, it is possible to achieve an effect that the branched line 43 collects dust inside the package case 1.

Hereinabove, the present invention has been described based on the example. The present invention is not limited to the contents described above, and it is needless to mention that the design can be suitably changed within a scope not departing from the gist of the present invention.

As described above, according to the present invention, it is possible to provide an optical modulator module which can reduce the problem of tin which is generated from a solder inside a package case, is transported in the vapor phase between electrodes, is deposited and grows between the electrodes, and causes deterioration of bias stability.

What is claimed is:

1. An optical modulator module, comprising:
    a waveguide substrate in which an optical waveguide and a control electrode for controlling a light wave propagating through the optical waveguide are foiined;
    a relay substrate which is disposed in a vicinity of the waveguide substrate and in which a DC bias wiring for supplying a DC bias voltage to the control electrode is formed; and
    a package case which stores the waveguide substrate and the relay substrate,
    wherein a loop of wire standing from the relay substrate to a position higher than a top surface of the waveguide substrate is provided in a part of the DC bias wiring, and
    wherein the loop of wire is disposed inside the package case at a position within 10 mm from any one of locations where a solder is used.
2. The optical modulator module according to claim 1, wherein the loop of wire is a loop of wiring which electrically connects the DC bias wiring and a wiring of the control electrode on the waveguide substrate.
3. The optical modulator module according to claim 1, wherein the loop of wire is provided in a positive wire or a negative wire of the DC bias wiring.
4. The optical modulator module according to claim 1, wherein a surface area of the loop of wire is 9,400 μm² or wider.
5. The optical modulator module according to claim 1, wherein the loop of wire is not coated.
6. The optical modulator module according to claim 1, wherein the DC bias voltage is 20 V or higher.
7. The optical modulator module according to claim 1, wherein a getter material adsorbing a vapor phase transportation substance is solder-connected to at least one of the waveguide substrate and the relay substrate.
8. The optical modulator module according to claim 1, wherein the DC bias wiring has a branched line.

* * * * *